United States Patent [19]

Nemoto

[11] Patent Number: 4,865,388
[45] Date of Patent: Sep. 12, 1989

[54] HEADREST FOR AUTOMOTIVE SEAT
[75] Inventor: Akira Nemoto, Akishima, Japan
[73] Assignee: Tachi-S Co., Ltd., Tokyo, Japan
[21] Appl. No.: 332,137
[22] Filed: Apr. 3, 1989
[51] Int. Cl.$^4$ ................................................ A47C 7/36
[52] U.S. Cl. ................................... 297/403; 297/408; 297/DIG. 3
[58] Field of Search .......... 297/403, 408, 391, DIG. 3

[56] References Cited

U.S. PATENT DOCUMENTS

| | | | |
|---|---|---|---|
| 4,017,118 | 4/1977 | Cawley | 297/391 |
| 4,123,104 | 10/1978 | Andres et al. | 297/391 |
| 4,415,203 | 11/1983 | Cawley | 297/DIG. 3 |
| 4,612,677 | 9/1986 | Crossett | 297/DIG. 3 |
| 4,720,146 | 1/1988 | Mawbey et al. | 297/408 |
| 4,761,011 | 8/1988 | Sereboff | 297/DIG. 3 |
| 4,778,218 | 10/1988 | Suman | 297/391 |

Primary Examiner—Francis K. Zugel
Attorney, Agent, or Firm—Browdy and Neimark

[57] ABSTRACT

A headrest for an automotive seat which comprises a head contact portion, a stretchable rear portion which includes an elastic webbing, and an air bag disposed within those two portions, all of them being fixed upon the top of seat back of the seat. The expansion or shrivelling of the air bag, by using an air pump, causes the headrest to raise for turning upright the head contact portion, or permits the air bag to be compressed by the contracting force of the webbing, thereby lowering the headrest.

6 Claims, 1 Drawing Sheet

HEADREST FOR AUTOMOTIVE SEAT

BACKGROUND OF THE INVENTION

1. Field of the Invention

The present invention relates to a headrest for an automotive seat, and particularly to the one mounted on a rear seat in an automobile.

2. Description of the Prior Art

Generally, a headrest adapted to be mounted on a rear seat is divided into an integral one which is formed integrally upon the rear seat and a separated type which is supported via a headrest stay on the rear seat. However, in both types of headrests, a disadvantage has been found in that the former integral one is not adjustable in height, while the latter separated one requires an occupant on the seat to change his or her seating posture into standing or turned posture for adjusting the height of the headrest, which is troublesome. Further, both headrests are fixed in height and not capable of being lowered close to the top of the rear seat, as a result of which, the headrests per se still remains objecttional and hindrance because they prevents good view of rear side of automobile and as such a front-seat driver does not have a clear view thereat.

SUMMARY OF THE INVENTION

In view of the above drawbacks, it is a first purpose of the present invention to provide a headrest for an automotive seat which may be lowered when in no use.

In achieving such purpose, a headrest in accordance with the present invention includes an expandable air bag fixed upon the top of seat back of the seat. In addition, the headrest comprises a head contact portion disposed forwardly of the air bag and stretchable rear portion disposed rearwardly of the air bag, the stretchable rear portion including an elastic webbing. The head contact portion and stretchable rear portion are connected together and further to the top of the seat back, whereupon the air bag is interposed within those two portions. The air bag is expanded when an air is supplied thereinto, or shriveled due to the contracting force of the webbing when the air is released from the air bag.

Accordingly, to supply air into the air bag causes the headrest to raise, thereby rendering upright the heat contact portion so as to support the head of an occupant on the seat, and alternatively, to release air from the air bag permits the air bag to be compressed by the contracting force of the webbing associated with the stretchable rear portion, thereby lowering the headrest close to a level flush with the top of the seat back. In one aspect, in the case of this headrest being mounted on the top of a rear seat, when in no use, the headrest is so lowered that a front-seat driver can have a better view at the rear of automobile, without hindrance of the headrest per se.

It is a second purpose of the present invention to provide the headrest which is simplified in structure and inexpensive in material for forming same.

Due to the use of the air bag or stretchable rear portion, a soft, inexpensive material can be used for forming the headrest, and the structure thereof is quite simplified. Thus, there is no need to use any metallic material or frame in producing the headrest, which contributes greatly to low-cost, rapid production of the same.

DETAILED DESCRIPTION OF PREFERRED EMBODIMENT OF THE INVENTION

Figure 1:
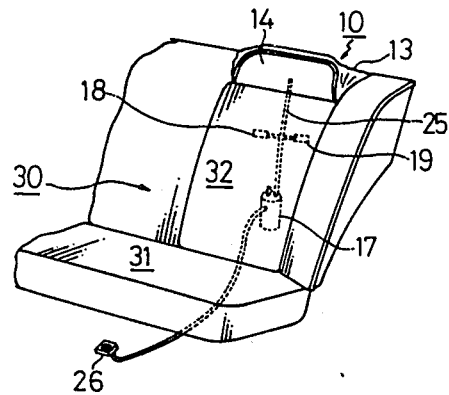
FIG. 1 is a partial perspective view of a rear seat in which a headrest in accordance with the present invention is mounted.

Referring to FIG. 1, is illustrated a headrest (10) in accordance with the present invention, which is integrally mounted on the top of a seat back (32) of a rear seat (30).

The headrest (10) has, accommodated therein, an air bag (11) which will be expalined later. As shown in FIG. 1, the air bag (11) is connected with a pipe (25) which is in turn connected with an electric air pump (17), so that an air is supplied to the air bag (11) by operation of a switch (26) which is disposed adjacent to a front seat (not shown) and electrically connected with the air pump (25).

Designations (18)(19) denote an air supply valve and an air release valve, respectively. The two air valves (18)(19) are connected with a mid-way part of the pipe (25). as shown. The air supply valve (18) is electrically connected with the switch (26) so that, when the air pump (17) is actuated by turning on the switch (26) for air supplying purpose, the air supply valve (18) is then opened automatically to allow an air to be drawn and supplied through the air pump (17) into the air bag (11). Preferably, a check valve should be used as the air supply valve (18), but alternatively an electro-magnetic valve may be used instead thereof. The air release valve (19) is an electro-magnetic valve, which is also electrically connected with the switch (26), although not shown. Thus, when it is desired to release an air from the air bag (11), the switch (26) is operated to cause the air valve (19) to open for letting out air from the air bag (11). Preferably, both air supply and release valves (18)(19) are each provided with an alerm whistle (not shown) which gives a sound indicating the state of air being supplied to or released from the air bag (11).

Figure 2:
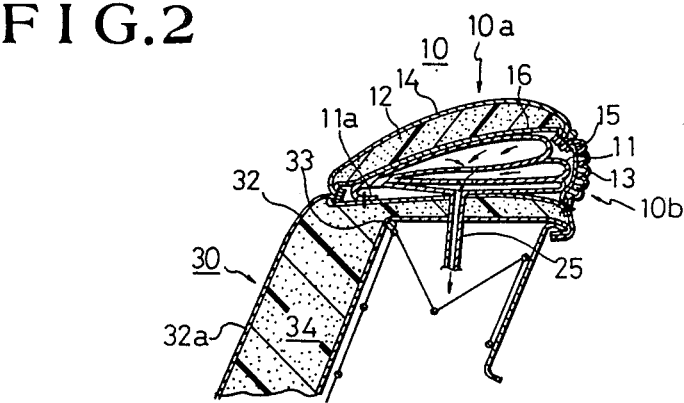
FIG. 2 is a longitudinally sectional view of the headrest as in the FIG. 1, which shows the headrest to be lowered.
Figure 3:
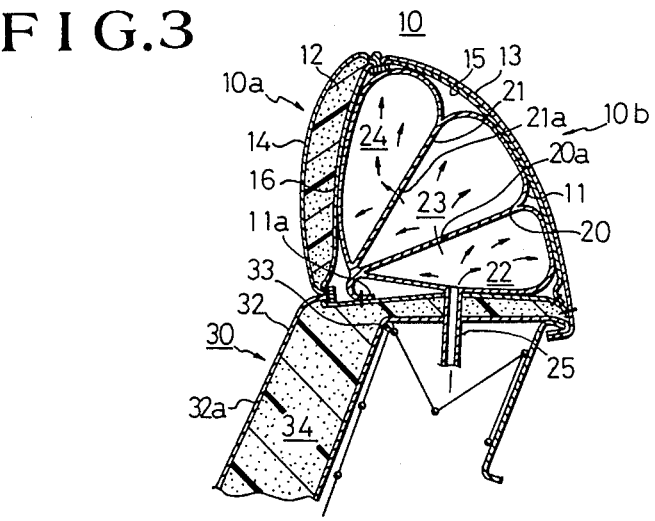
FIG. 3 is a longitudinally sectional view of the same headrest, which shows that the headrest is raised by the expansion of an air bag therein.

As best shown in FIGS. 2 and 3, the headrest (10) is comprised of a head contact portion (10a) whose lower end is sewn to the top surface member (32a) of the rear seat (32), a stretchable rear portion (10b) of which upper end is sewn to that of the head contact portion (10a) and further of which lower end is connected firmly to the seat back (32) at the rear side thereof, and the air bag (11) which is provided within those two portions (10a)(10b).

The head contact portion (10a) is formed by a top surface member (14), a foam padding (12) (preferably made of an urethane foam) and a back cloth (16) in such a manner as to have a proper rigidity for supporting the head of an occupant who sits on the rear seat (30).

The strechable rear portion (10b) is composed of an outer covering member (13) and an elastic webbing (15) (made of a rubber, for instance). The outer covering member (13) is preferably made of a soft, elastic material or a suitable cloth, and sewn to the peripheral edge of the head contact portion (10a), excepting the lower side thereof, such that the rear side of the head contact portion (10a) is covered with the outer covering member (13). Inside the outer covering member (13), is arranged the elastic webbing (15). As best seen in FIG. 2, the outer covering member (13) is sewn to the outer surface of the webbing (15) in a gathering fashion such as to define a plurality of bellows or accordion pleats thereupon. The webbing (15) is at its upper and lower ends fixed by sewing to the upper end of the head contact portion (14) and the rear end side of the seat back (32), respectively. It is noted here, by referring to FIGS. 2 and 3, that the accordion pleats created in the upper covering member (11) are so designed as to be stretched into an even layer juxtaposed on the circumferential surface of expanded webbing (15) when the air bag (11) is expanded.

Referring to FIG. 3, the air bag (11) is preferably made of a rubberized fabric and formed such that there are provided threee air rooms (22)(23)(24) therein, which are defined by two partition walls (20)(21). In other words, the illustrated air bag (11) is formed in a generally triangular shape in cross-section, and has the two partition walls (20)(21) formed integrally therein, whereby are defined the first lower air room (22), second intermediate air room (23), and third upper air room (24), each thus being to be expanded in a generally triangular cross-section when air is supplied to the air bag (11), as will be described later. A lug (11a) is formed integrally at the forward end part of the air bag (11) and fixed by sewing on the top of the seat back (32). The two partition walls (20)(21) are respectively formed with through holes (20a)(21a) which communicate the three air rooms (22)(23)(24) with one another for allowing flow of air through all of those air rooms. As shown, the pipe (25) is connected with the lower surface of the air bag (11) for air communication.

Accordingly, when the air bag (11) is expanded fully with the supply of air thereinto, the head contact portion (10a) is raised from the generally horizontal non-use state as in FIG. 2, up to the upright use state as in FIG. 3, whereupon the headrest (10) is placed in a use condition for supporting the head of an occupant on the rear seat (30).

Designations (31), (33) and (34) denote a seat cushion of the rear seat (30), a back frame of the seat back (32) and a cushion member in the seat back (32), respectively.

Normally, the headrest (11) is placed in a nonuse state in which the head contact portion (10a) lies in a generally horizontal state upon the top of the seat back (32), thus permitting a good view at the rear of automobile (not shown) through its rear window (not shown), without hindrance of the headrest (11), so that a wider view at the rear of automobile may be given to a driver seated in the front seat. For that purpose, in operation, the switch (26) is operated for releasing air from the air bag (11), at which time, the air release valve (19) is opened electrically and the air in the air bag (11) is force out through the pipe (25) due to the fact that the air bag (11) is compressed by the contracting force of the expanded webbing (15), with the result that, as the air bag (11) is shriveled, the air therein is forced out as shown by the arrow in FIG. 2.

When it is desired to use the headrest (11) in the case of a rear occupant being seated on the rear seat (30), the driver on the front seat operates the switch (26) to actuate the air pump (17) and open the air supply valve (18), to thereby supply an air into the air bag (11). As shown in FIG. 3, the air is introduced into the air bag (11) in the arrow direction, expanding the first, second and third air rooms (22)(23)(24), whereby the head contact portion (10a) is rotated upwards with respect to its lower end and brought to the upright state illustrated, while simultaneously, the webbing (15) is expanded forcibly with such swelling of air back (11) and the outer covering member (13) is stretched from the pleated state as in the FIG. 2 into the even layer circumscribing the expanded outer surface of the webbing (15) as in FIG. 3. Consequently, with the air being full in the air bag (11), the head contact portion (10a) stands upright sufficiently for supporting the head of the rear occupant.

From the above description, it is appreciated that, in accordance with the present invention, the headrest (10) is raised for use state or lowered for non-use state, pneumatically, and in particular, the height of the headrest (10) may be lowered close to a zero level, equal to the top of the rear seat, hence permitting a front-seat driver to have a clear or wider view at the rear of automobile through its rear window, without hindrance of the headrest (10) per se. Further, the structure of the headrest (10) is quite simplified, using an inexpensive, soft material, which does not need any metallic element or frame and greatly contributes to low-cost, rapid production of the headrest.

It should be understood that the present invention is not limited to the illustrated embodiment, but any other modifications, replacements and additions will structurally be possible without departing from the scopes and spirits of the appended claims for the invention. In this connection, the two partition walls (20a)(21a) may be increased or decreased in number, since the formation of those partition walls is intended for reinforcing the air bag (11).

What is claimed is:

1. A headrest for an automotive seat, comprising:
an expandable air bag provided on a top of a seat back of said seat;
a head contact portion disposed forwardly of said air bag; and
a stretchable rear portion disposed rearwardly of said air bag, said stretchable rear portion including an elastic webbing which has a contracting force for compressing said air bag,
wherein said head contact portion and said stretchable rear portion are connected together and further to said top of said seat back, and wherein said air bag is disposed within said head contact portion and said stretchable rear portion.

2. The headrest according to claim 1, wherein said air bag has a plurality of partition walls formed therein, which define a plurality of air rooms in said air bag, and wherein said partition walls are each formed with a through hole so as to permit an air communication among said plurality of air rooms.

3. The headrest according to claim 1, wherein said air bag is connected with a pipe which is in turn connected with an air pump.

4. The headrest according to claim 3, wherein said pipe is connected with an air supply valve and air release valve.

5. The headrest according to claim 1, wherein said head contact portion comprises an outer covering member, a foam padding and a back cloth, wherein said stretchable rear portion further includes an outer cover member which is sewn to said webbing in a gathering fashion such as to define a plurality of bellows or acccordion pleats on said outer cover member of said stretchable rear portion, and wherein both said outer covering members of said head contact portion and stretchable rear portion are integrally fixed by sewing to said top of said seat back.

6. The headrest according to claim 1, wherein said air bag is formed such that it is to be expanded in a generally triangular shape such as to turn upright said head contact portion in a position for supporting a head of occupant seated in said seat, and wherein said air bag is fixed on said top of said seat back via a lug which is integrally formed at a forward end part of said air bag.

* * * * *